Figure 1:
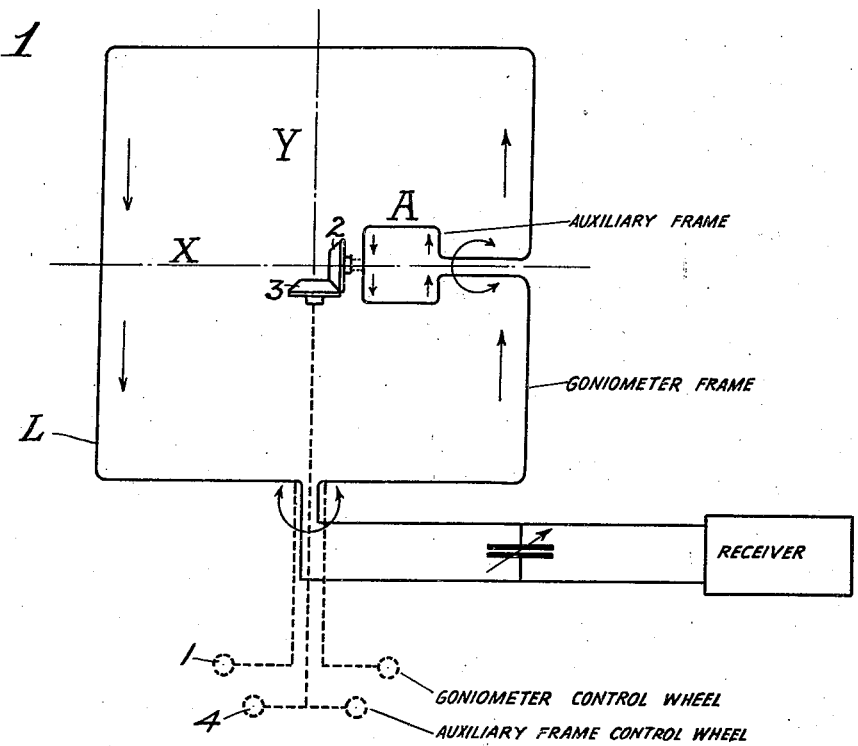

Aug. 11, 1931.   A. MEISSNER   1,818,639

RADIO DIRECTION FINDING

Filed Dec. 31, 1926

INVENTOR
ALEXANDER MEISSNER
BY
ATTORNEY

Patented Aug. 11, 1931

1,818,639

UNITED STATES PATENT OFFICE

ALEXANDER MEISSNER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

RADIO DIRECTION FINDING

Application filed December 31, 1926, Serial No. 158,141, and in Germany January 19, 1926.

My invention relates to direction finding and more particularly direction finding with very short waves.

Experiments have shown that the production of a sharp minimum in direction finding work with transmitters operating with very short waves is not possible on the ground that the oscillation coming to act upon the receiving aerial is influenced in its state of polarization and its direction due to the different reflection and refraction phenomena. With reference to the impinging wave distinction may be made between a direct and an indirect ray or radiation, if by the former is meant the wave propagating along the surface of the earth, and as the indirect radiation the part of the radiation passing through the higher atmospheric layers. Some authors distinguish between and use the terms "surface" and "space waves". The oscillations of the space waves, as has been ascertained, are so inclined that they contain two magnetic field components, one thereof being parallel to ground, while the other forms an angle with the earth ranging between 30 and 50 degrees and being at right angles to the first component. If, for instance, a direction finder frame or loop by being turned about its vertical axis, is set to the minimum strength of the magnetic field of the surface wave, a current will nevertheless be induced in it by the space wave falling upon it at a slope from above, and the result is that no sharp minimum is obtainable One way to illustrate the problem to be contended with is based upon the following considerations. A loop in plan view has directional characteristics which may be expressed by a figure 8. But with respect to a wave approaching the loop in a vertical direction instead of a horizontal direction, the loop also will have figure 8 directional characteristics. More generally, in any plane obtained by swinging the horizontal plane about a horizontal axis at right angles to the loop, the loop will have a figure 8 characteristic. We therefore can say that the directional effect may be expressed by a torus standing in an upright position. True zero reception, it is readily appreciated, will only be obtained if the propagated wave approaches along the axis of this vertical figure, that is, along a line which is perpendicular to the plane of the loop, and which therefore must be horizontal. For this reason, when a very short wave approaches in a direction not substantially horizontal, it will affect the loop and effect a signal, thereby making true zero reading impossible.

Now, in accordance with the means and method disclosed in the present invention a separate small-sized loop is combined with the directional antenna used for goniometric work, said supplementary coil being so orientated that it picks up energy from the space radiation or wave, and that, by convenient and well-known means, it is caused to produce a compensation in the receiver circuit of the disturbing action occasioned in the direction-finder aerial by the space radiation. Apart from coil, loop, or frame antennæ, it is, of course, also feasible to use goniometric devices and devices and systems of vertical antennæ. Also in lieu of the additional small-sized auxiliary loop, it seems that a small directional antenna of a different nature and small size may be employed.

Figure 2:
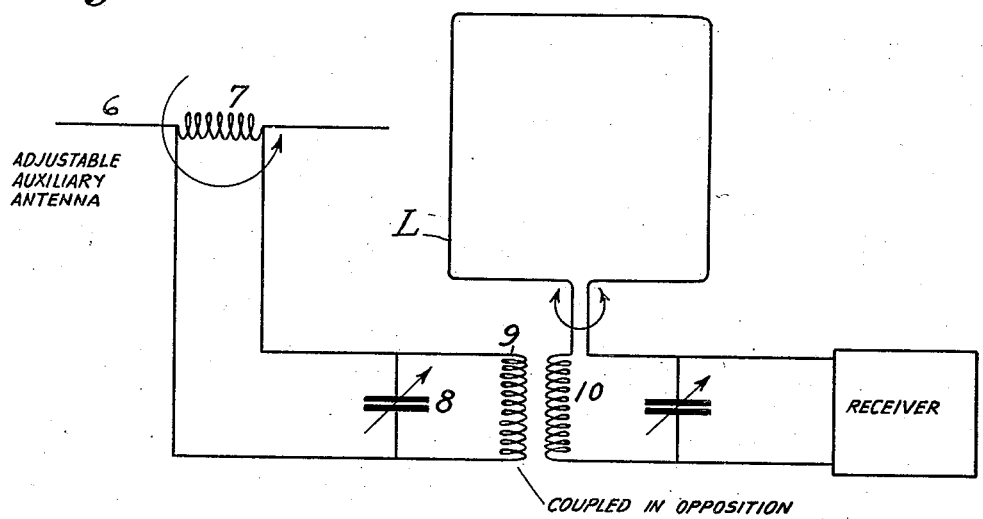

A more complete understanding will be had of the invention by reference to the drawings, in which Figure 1 shows a goniometer including an auxiliary frame aerial which supplies a compensating circuit; while, Figure 2 shows a radio goniometer where the compensating current is supplied by an auxiliary open aerial.

Referring in particular to Figure 1 of the drawings, the main loop L rotatable about its vertical axis Y by means of hand wheel 1 has in series therewith an auxiliary aerial A adapted to be rotated about a horizontal axis X by means of a pair of bevelled gears 2, 3, the latter of which is driven by a hand wheel 4. In operation L is orientated about its axis to a position at which it responds only or substantially only to the indirect space component of the signal, that is, to that portion of the signal which reaches the receiver by an indirect path.

In Figure 2 the compensating current is supplied by means of an auxiliary aerial 6 including a series inductance 7, the potential variation in signal voltage across which is supplied through a tuned circuit 8 including a primary winding 9 coupled in opposition through a secondary winding 10 to the main auxiliary loop circuit. The auxiliary loop L in Figure 2 is rotated about a vertical axis as is the auxiliary open aerial 6 as is indicated by the arrows surrounding the axis of the loop aerial and the auxiliary aerial. The open aerial may be rotated about a horizontal axis passed through its electrical midpoint normal to its length as indicated. It will be understood, however, that the physical dimensions of the open aerial may be such that enough indirect signal energy for compensating purposes may be obtained without rotating the open aerial about its horizontal axis.

I claim:

1. A radio goniometer for direction finding comprising a loop mounted for rotation on a vertical axis, and a smaller loop mounted for rotation on a horizontal axis and so electrically connected to the larger loop that their energies are combined in opposition.

2. A directional receiver including, a rotatable directional aerial, an auxiliary directional aerial adapted to be moved relative to said first named aerial to a position at which it predominantly responds to the vertical component of the received signal, and means for combining the energies in said aerials in phase opposition.

3. A directional receiver comprising, a rotatable directional aerial, and an auxiliary directional aerial adapted to be moved relative to said first named aerial to a position at which it predominantly responds to the vertical component of the received signal and so coupled to the first aerial that the energies are combined in phase opposition therein.

ALEXANDER MEISSNER.